US008627228B2

(12) United States Patent
Yosef et al.

(10) Patent No.: US 8,627,228 B2
(45) Date of Patent: Jan. 7, 2014

(54) AUTOMATIC SASH CONFIGURATION IN A GUI ENVIRONMENT

(75) Inventors: Nadav Har'El Yosef, Misgav (IL); Yuri Rabinovich, Kiryat Yam (IL); Haggai Roitman, Yoknea'm Elit (IL)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 13/305,762

(22) Filed: Nov. 29, 2011

(65) Prior Publication Data

US 2012/0166980 A1    Jun. 28, 2012

Related U.S. Application Data

(63) Continuation-in-part of application No. 12/471,383, filed on May 24, 2009, now abandoned.

(51) Int. Cl.
*G06F 3/048* (2013.01)

(52) U.S. Cl.
USPC .......................................... 715/798; 715/789

(58) Field of Classification Search
USPC .................................. 715/789, 798
See application file for complete search history.

(56) References Cited

U.S. PATENT DOCUMENTS

| 5,771,042 A | 6/1998 | Santos-Gomez |
| 6,195,094 B1* | 2/2001 | Celebiler .................... 715/764 |
| 6,271,838 B1* | 8/2001 | Gentner et al. ............... 715/788 |
| 2006/0004680 A1* | 1/2006 | Robarts et al. ................ 706/12 |
| 2008/0158189 A1* | 7/2008 | Kim ............................ 345/173 |
| 2009/0144653 A1* | 6/2009 | Ubillos ........................ 715/800 |
| 2010/0138767 A1* | 6/2010 | Wang et al. .................. 715/769 |

* cited by examiner

*Primary Examiner* — Doon Chow
*Assistant Examiner* — Le Nguyen
(74) *Attorney, Agent, or Firm* — Daniel Kligler

(57) ABSTRACT

A graphical user interface generation system offers a management module that displays GUI elements and a visual indicator in an editing window. The visual indicator is movable in the editing window, which has at least two panels and a divider between the panels. A configuration history of the divider including at least one prior location of the divider in the editing window is memorized. An optimization function is defined for determining a new configuration of the divider. The function is invoked responsively to the configuration history of the divider to determine the new configuration of the divider, and a current configuration of the divider is automatically reset on the display to the new configuration of the divider within the editing window.

27 Claims, 5 Drawing Sheets

AUTOMATIC SASH CONFIGURATION IN A GUI ENVIRONMENT

BACKGROUND OF THE INVENTION

The present invention relates generally to the field of graphical user interface systems, and specifically to systems and methods for automatic resizing of window panels within a graphical user interface environment.

In a graphical user interface (GUI) used to provide a workspace within an editing window, a sash (also known as a divider or separator) may offer a division between two panels residing within the editing window. The position of the sash defines a portion of the workspace that each of the panels is allotted by the GUI for display. The workspace within the editing window is defined by a border, which surrounds the workspace and may also include a title bar and a series of menu options for management of the appearance and the contents of the workspace. Each panel may be used for object creation and customization, such as when the workspace contains a GUI development editor.

SUMMARY OF THE INVENTION

An embodiment of the present invention provides a computer-implemented method for adjusting a computer display, which is carried out by presenting on a display of a computer a graphical user interface (GUI) management module for generation of a GUI that offers in an editing window selectable GUI elements and a visual indicator, the visual indicator being movable in the editing window, the editing window having at least two panels and a divider between the panels. A configuration history of the divider including at least one prior location of the divider in the editing window is memorized. An optimization function is defined for determining a new configuration of the divider. The function is invoked responsively to the configuration history of the divider to determine the new configuration of the divider. A current configuration of the divider is automatically reset on the display to the new configuration of the divider within the editing window.

In a disclosed embodiment, a computer-implemented method is provided for adjusting a computer display, which is carried out by presenting on a display of a computer a graphical user interface (GUI) management module for generation of a GUI that offers in an editing window GUI elements that are selectable by use of a pointing device that generates a visual indicator on the editing window, the editing window having at least two panels and a divider between the panels. A configuration history of the divider including at least one prior location of the divider in the editing window is memorized. An optimization function is defined for determining a new configuration of the divider. The function is invoked responsively to the configuration history of the divider to determine the new configuration of the divider. A current configuration of the divider is automatically reset on the display to the new configuration of the divider within the editing window.

Other embodiments of the invention provide computer software product and apparatus for carrying out the above-described method. Still other embodiments of the invention provide techniques for configuring a computer software product for carrying out the above-described method cooperatively with computer apparatus.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF EMBODIMENTS

Overview

Figure 1:
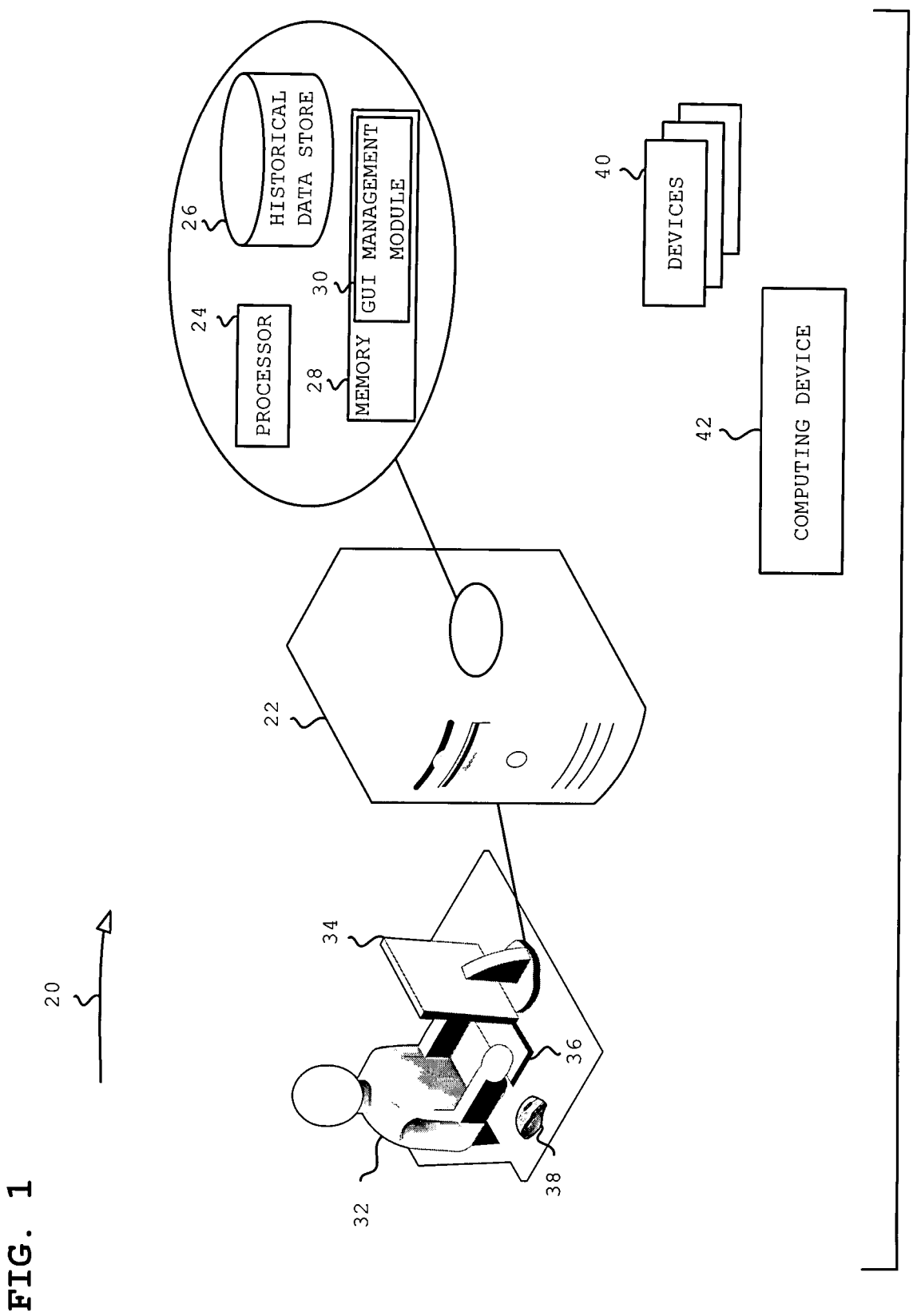
FIG. 1 is a block diagram that schematically illustrates a system for automatically resizing window panels within a graphical user interface environment, in accordance with an embodiment of the present invention.

Embodiments of the present invention that are described hereinbelow provide improved methods, products and systems for automatically resizing window panels within a graphical user interface (GUI) environment. In an editing window provided by a GUI, for example when using a software development editor, it is desirable to provide a developer or operator with an environment for editing that typically includes more than one panel. (In the context of the patent application and claims, the term "panel" refers to a subsection of the editing window associated with specific GUI elements, which may be hidden when at least some of the subsection is invisible.) In the past, some editing windows required the operator to manually configure a divider between two panels to determine the portion of each panel visible in the GUI. (In the context of the patent application and claims, the term "divider" refers to any graphical element that divides between two panels that reside on the editing window provided by the GUI, and is also sometimes referred to herein as a sash.) As a result, the operator would spend time configuring the divider, typically using a pointing device that generates a visual indicator in the editing window, rather than focusing upon primary tasks such as selecting GUI elements. Often, a GUI element could not be selected or seen in entirety within one of the panels without additional manual configuration of the divider to enlarge one of the panels. Many tasks employing the editing window made it necessary for the operator to switch back and forth between the panels from time to time, thus burdening the operator with cumbersome and often distracting manual divider configuration tasks.

In embodiments of the invention, a GUI management module memorizes a configuration history of the divider, storing prior locations of the divider in the editing window, typically in addition to storing historical data such as GUI element locations associated with the prior divider locations. The GUI management module defines an optimization function to determine a new configuration of the divider, wherein a change of the location of the pointing device may result in a corresponding change of the current divider configuration. That is to say, a focus event may occur in the editing window and may change the result obtained when invoking the optimization function. (In the context of the patent application and claims, the term "focus event" refers to any event that causes the GUI management module to change the focus of the editing window, and thus the location of the visual indicator generated by the pointing device.) In one example, a keyboard shortcut typed by the operator may select a different GUI element, thus changing a focus of the editing window, which is defined herein as a location in the editing window where GUI element selection is taking place, typically in proximity to the visual indicator. Subsequent to the focus event, invocation of the optimization function by the GUI management module may result in a determination that the optimum configuration of the divider has changed, requiring the divider to be moved within the editing window. In the new configuration of the divider, the operator is provided with a wider view of the panel in which the selected GUI element is displayed.

The current location of the visual indicator is determined by the GUI management module. Various focus events may cause the GUI management module to change the current location of the visual indicator, which is movable in the editing window. Some exemplary focus events include movement of the pointing device in proximity to one or more of the GUI elements or a "mouse click" when the visual indicator overlaps the GUI element. Other examples of focus events instigated by the operator or induced automatically are described hereinbelow. The GUI element that is most proximate to the current location of the visual indicator is identified by the GUI management module.

The GUI management module extracts prior locations of the divider from the configuration history of the divider for the identified GUI element. That is to say, a list of pairs of coordinates that identify historical divider locations associated with locations of the GUI element are selected for use in determining the optimum configuration of the divider for the current location of the visual indicator. The configuration history of the divider comprises recorded manipulations of the divider along with locations of the GUI elements after each manipulation. The manipulations of the divider, performed by the operator or automatically induced, are used by the GUI management module for the purpose of learning the ideal location of the divider, as described hereinbelow. The extracted prior locations of the GUI element are input by the GUI management module into the invoked optimization function, to identify the new configuration of the divider. The GUI management module automatically resets the configuration of the divider to the new configuration, thereby eliminating the need for the operator to configure the divider. Embodiments of the present invention thus provide the operator with an elegant, fluid editing experience.

System Description

Reference is now made to FIG. 1, which is a block diagram that schematically illustrates a system 20 for automatically resizing window panels within a GUI environment, in accordance with an embodiment of the present invention. System 20 typically comprises a general-purpose computer 22, which is programmed in software to carry out the functions that are described herein. Computer 22 comprises a processor 24, a historical data store 26, and a memory 28, which holds data structures and information that are used in performing these functions. Historical data store 26 comprises any storage media known in the art, such as a direct access hard disk. GUI management module 30 is held in memory 28. GUI management module 30 may be downloaded to computer 22 in electronic form, over a network, for example, or it may alternatively be provided on tangible media, such as optical, magnetic or electronic memory media. Further alternatively, at least some of the functions of computer 22 may be carried out by dedicated electronic logic circuits. Although the embodiment relates to one particular system for display adjustment, the principles of editing that are implemented in system 20 may similarly be applied, mutatis mutandis, in other types of GUI editing systems, using other techniques for automatic resizing of window panels within a graphical user interface environment.

System 20 may be controlled by an operator 32 or may be operated automatically. Processor 24 operates a display 34. By way of example, operator 32 is assumed to operate computer 22 using a keyboard 36 and/or a pointing device 38, which provide operator inputs to computer 22. It is understood, however, that operation of embodiments of the present invention is not limited to a particular method for inputting to computer 22, that any other suitable system for providing such operator inputs may be used, and that all such systems are considered to be within the scope of embodiments of the present invention.

System 20 includes one or more devices 40 for producing a software product on a computer-readable medium, for example a CD or DVD writer. Devices employing many other technologies are also suitable for use as devices 40, for example, writers adapted to tapes, hard disc drives, RAM, ROM, flash memory devices, floppy drives, programmable read-only memory (PROM), erasable programmable read-only memory (EPROM), and magneto-optical discs. In all of these technologies patterns or transitions in the physical state of the medium are formed therein. These patterns and sequences of transitions encode instructions or data, e.g., binary numbers that are acceptable to the processor. The nature of the state transitions varies with the particular medium, and includes changes in magnetic domains in magnetic media, formation of pits or bumps on an optical disk, etc. Once the transitions are established, the medium may be transferred to another computing device 42, which is capable of reading the medium, recognizing the transitions, and decoding them to identify executable instructions or data.

Figure 2:
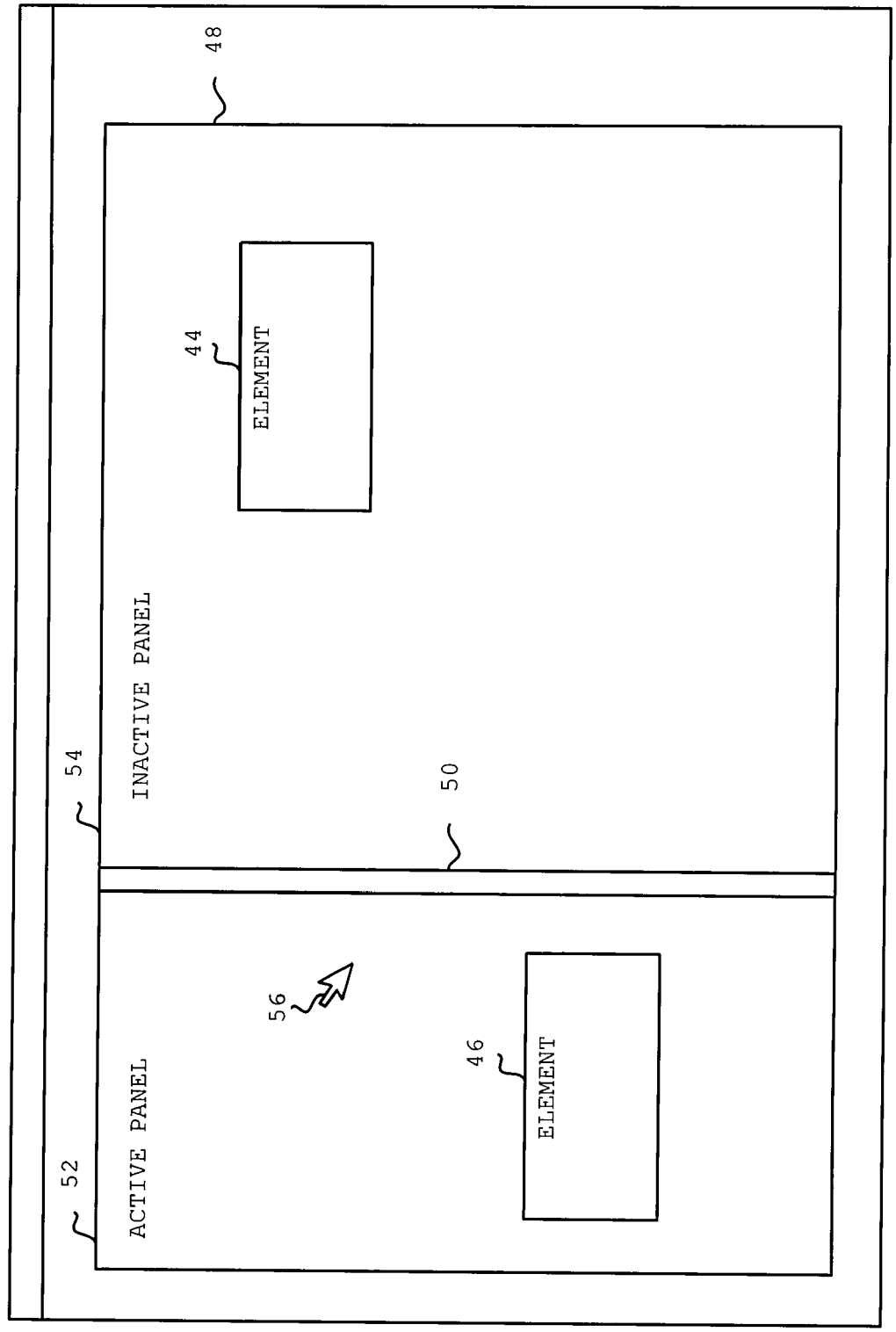
FIG. 2 is a schematic, pictorial illustration of a user interface screen for editing graphical user interface elements, in accordance with an embodiment of the present invention.

Reference is now made to FIG. 2, which is a schematic, pictorial illustration of a user interface screen for editing graphical user interface elements, in accordance with an embodiment of the present invention. GUI management module 30 (FIG. 1) offers GUI elements 44, 46 for selection by operator 32 in an editing window 48 on display 34. Editing window 48 comprises a divider 50 and two panels, an active panel 52 and an inactive panel 54, wherein "active" denotes the panel currently in use. That is to say, active panel 52 is the panel displaying the current location of a visual indicator 56. Once visual indicator 56 is moved from one panel to the other panel, e.g., by using pointing device 38, the other panel becomes the active panel.

Divider 50 is a graphical element that is used to separate between active panel 52 and inactive panel 54, and may be "dragged" from one side of editing window 48 to the other, so as to reapportion the visible areas of each panel according to the changed location of divider 50. That is to say, after divider 50 is dragged to enlarge the visible portion of active panel 52, more of active panel 52 is displayed in editing window 48 on display 34, while less of inactive panel 54 is visible. An example to further illustrate dragging divider 50 is provided hereinbelow in association with FIG. 3.

Operator 32 may choose to select GUI elements 44, 46 and to drag divider 50 by using pointing device 38, although other methods for selection of GUI elements 44, 46 and for dragging divider 50 known to those who are skilled in the art may be used. As described hereinabove, moving visual indicator 56 in editing window 48 to select GUI elements 44, 46, to drag divider 50, or for any other reason, changes the focus of the GUI. When the focus is changed, the focus event is considered to have occurred. GUI management module 30 may memorize the current configuration of divider 50 and the other GUI elements when the focus event occurs, and may store historical data in historical data store 26 (FIG. 1). An exemplary list of memorized historical data fields typically stored to provide the configuration history, including descriptive text, is given in Table 1.

TABLE 1

Historical data fields and associated text

| | |
|---|---|
| GUI element ID | A unique identifier that identifies the GUI element ID |
| GUI element location | The coordinates of the GUI element anchor, or reference point of the GUI element |
| GUI element panel | An identifier that indicates the panel the GUI element is currently associated with |
| Divider location | The coordinates of the divider anchor, or reference point of the divider |
| ... | ... |

Other historical data fields known to those who are skilled in the art may be used to delineate the configuration history of divider 50.

Figure 3:
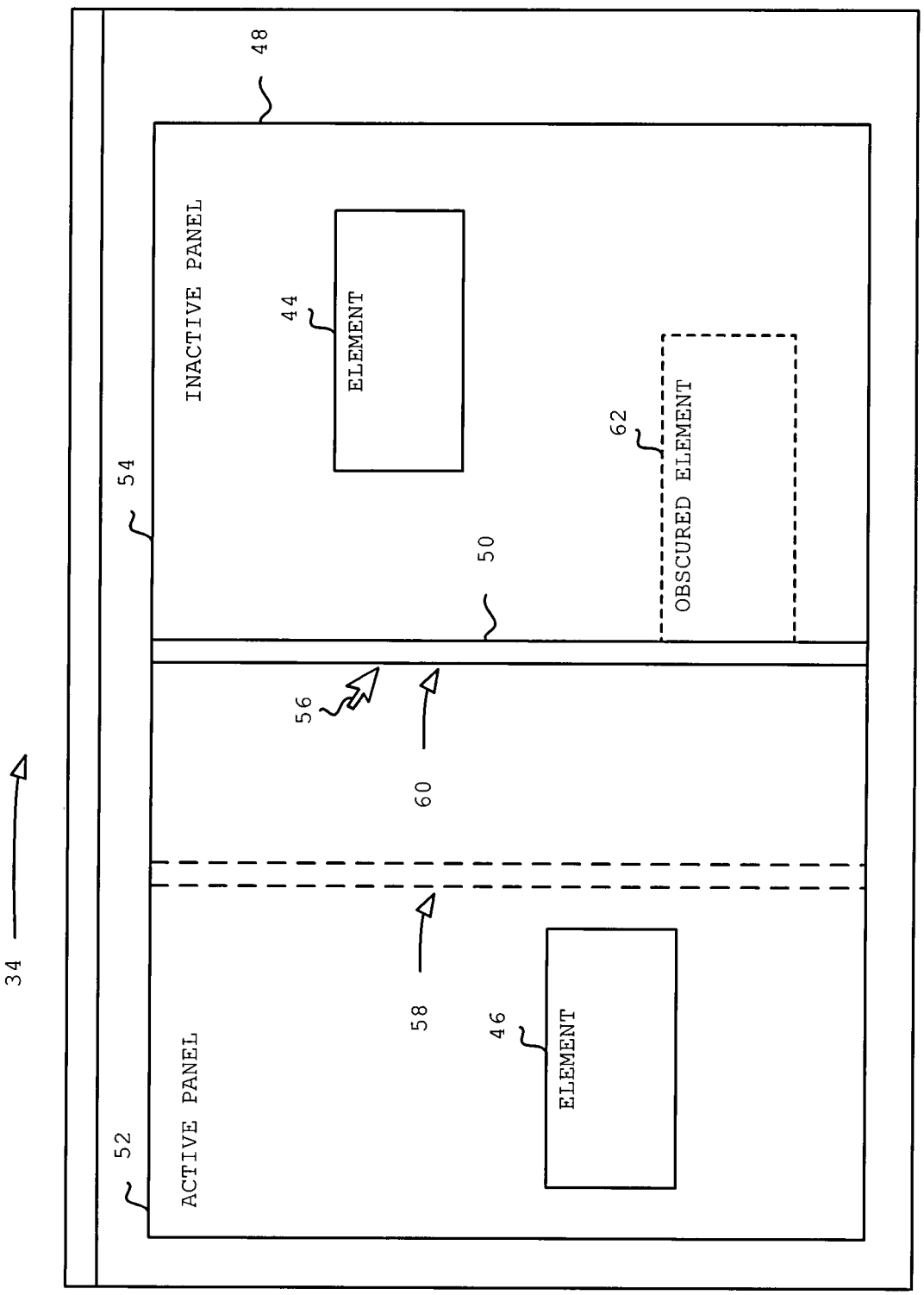
FIG. 3 is a schematic, pictorial illustration of a user interface screen for editing graphical user interface elements, in accordance with an embodiment of the present invention.

Reference is now made to FIG. 3, which is a schematic, pictorial illustration of a user interface screen for editing graphical user interface elements, in accordance with an embodiment of the present invention. As mentioned hereinabove, divider 50 may be dragged by operator 32 changing the location of visual indicator 56 while divider 50 is selected, e.g., by moving pointing device 38 (FIG. 1), from a first location 58 in editing window 48 to a second location 60. After divider 50 has been moved, in the example of FIG. 3, one of GUI elements 44, 46, may become an obscured GUI element 62. Obscured GUI element 62 is partially visible in inactive panel 54, while partially blotted out by divider 50 after having been dragged to second location 60.

After the focus event has occurred, GUI management module 30 may determine a current location of visual indicator 56 and, in the present example, identifies one of GUI elements 44, 46 or obscured GUI element 62 as most proximate to the current location. By invoking the optimization function described hereinbelow, GUI management module 30 is able to use data extracted from historical data store 26 (FIG. 1) to determine a new configuration of divider 50, and automatically resets divider 50 to the new configuration in editing window 48.

Automatic Divider Configuration

Figure 4:
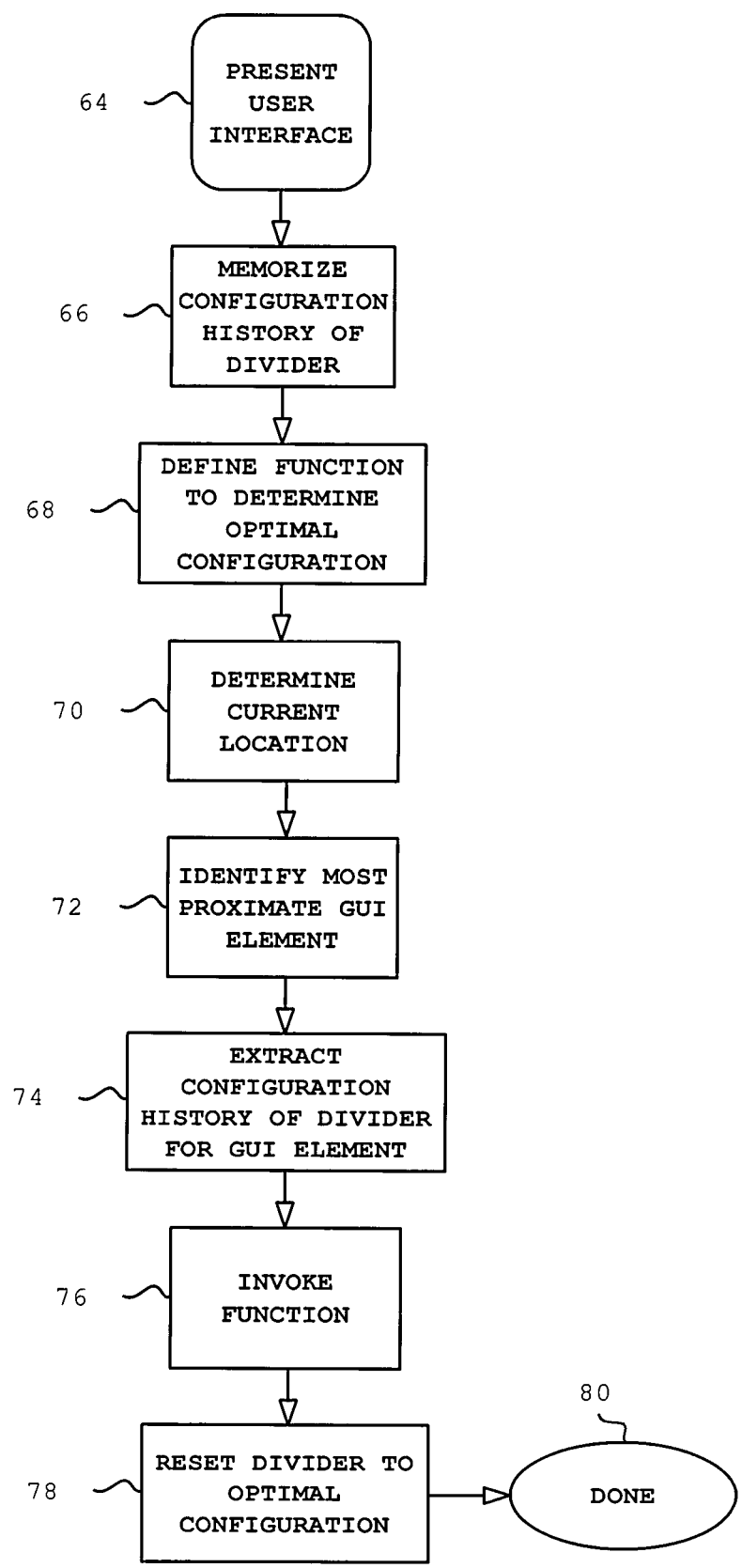
FIG. 4 is a flow chart that schematically illustrates a method for automatically resizing window panels within a graphical user interface environment, in accordance with an embodiment of the present invention.

Reference is now made to FIG. 4, which is a flow chart that schematically illustrates a method for automatically resizing window panels within a graphical user interface environment, in accordance with an embodiment of the present invention. GUI management module 30 (FIG. 1) causes processor 24 to present editing window 48 (FIG. 2) on display 34 to operator 32 and to perform the steps listed hereinbelow. GUI management module 30 provides operator 32 with editing window 48 for the selection of GUI elements 44, 46, in a user interface presenting step 64.

GUI management module 30 memorizes the configuration history of divider 50 (FIG. 2) in a configuration history memorization step 66. The focus event described hereinabove, wherein the focus of the GUI in the editing window is changed, may initiate history memorization step 66. Typically, operator 32 (FIG. 1) drags divider 50 when editing in order to adjust the panels to a preferred configuration when editing a particular GUI element. Storing the historical data in historical data store 26 enables the configuration of divider 50 to be automatically reset to the historical configuration when the configuration is determined to be optimal.

An optimization function is defined by GUI management module 30 for determining a new configuration of divider 50 in a function definition step 68. A simple function may be used, such as selecting the divider configuration that occurs with the most frequency in the historical data for the particular GUI element. Similarly, the most recent divider configuration for the particular GUI element may be deemed by the function to be optimal. Alternatively, the optimization function can be developed using known heuristic techniques. In one example, reinforcement learning may be provided by using an algorithm introduced in a document by Kaelbling et al., entitled "Reinforcement Learning: A Survey" (Journal of Artificial Intelligence Research 4, 1996). The Kaelbling et al. document describes a well known "exploration vs. exploitation" issue, wherein a learning agent needs to devote effort in each of two areas. In exploration, the learning agent performs trials and gathers data from the trial results in order to make better decisions, thus "exploring." In the current example, with GUI management module 30 acting as the learning agent, future changes to the divider configuration may be used as exploration data. In exploitation, the learning agent applies what is already known from prior exploration, and makes the best possible decisions accordingly, thus "exploiting." In the current example, the historical data can be used as the output of prior exploration.

In yet another example, the optimization function can be developed using "risk-based analysis", wherein GUI management module 30 (FIG. 1) maintains a new historical data field in historical data store 26 to track the behavior of divider 50 (FIG. 2) in association with GUI elements 44, 46. The new historical data field contains a count of the number of times that divider 50 is moved, e.g., by operator 32, from the location in the editing window where GUI element selection is taking place. In the present example, GUI management module 30 may use the data in the new historical data field to determine the divider configuration having a minimum risk. Risk is defined in the current example as the chance that divider 50 will need to be moved from the current location, associated with the particular GUI element. Risk is minimized by the divider configuration providing the lowest chance for operator 32 to move divider 50 after the configuration has been reset. Typically, a feasible solutions space of the optimization function must also satisfy a restriction that the divider configuration may not result in active panel 52 (FIG. 3) obscuring the particular GUI element. Thus, an optimal solution may be provided by the optimization function sorting potential configurations of divider 50 by their risk and outputting the divider configuration with the lowest risk that also satisfies the restriction.

As described hereinabove, the focus event may result in the location of the visual indicator changing. In a location determining step 70, GUI management module 30 (FIG. 1) determines a current location of the visual indicator. Operator 32 may click a button on pointing device 38 when the visual indicator overlaps the particular GUI element. However, many other actions performed by operator 32 or automatically, may cause a focus event to occur, by making the current location of the visual indicator change. Some additional examples include devices such as graphics tablets and touch screen monitors, whereby movement with or through the device is mapped to locations on editing window 48 (FIG. 2). Similarly, systems that detect eye movement and focus, recognize voice commands, or identify laser pointer emplacement, may also be used to indicate locations on editing window 48 using eye motion, voice, and laser light detection components respectively. In these and other similar cases, the device or system causes the visual indicator to change location and thus the focus event to occur.

In the current example, GUI management module 30 (FIG. 1) uses the current location and identifies one of GUI elements 44, 46 (FIG. 2) or obscured GUI element 62 (FIG. 3) as most proximate to the current location in a GUI element identification step 72. The configuration history for the identified GUI element is extracted by GUI management module 30 from historical data store 26 in a configuration history extracting step 74. GUI management module 30 determines the new configuration by invoking the optimization function in a function invoking step 76 and inputting the configuration history to obtain the new configuration. If the current configuration of divider 50 is different than the new configuration, GUI management module 30 automatically resets divider 50 to the new configuration in a divider configuration resetting step 78.

The method then terminates at a final step 80.

Alternative Embodiments

Figure 5:
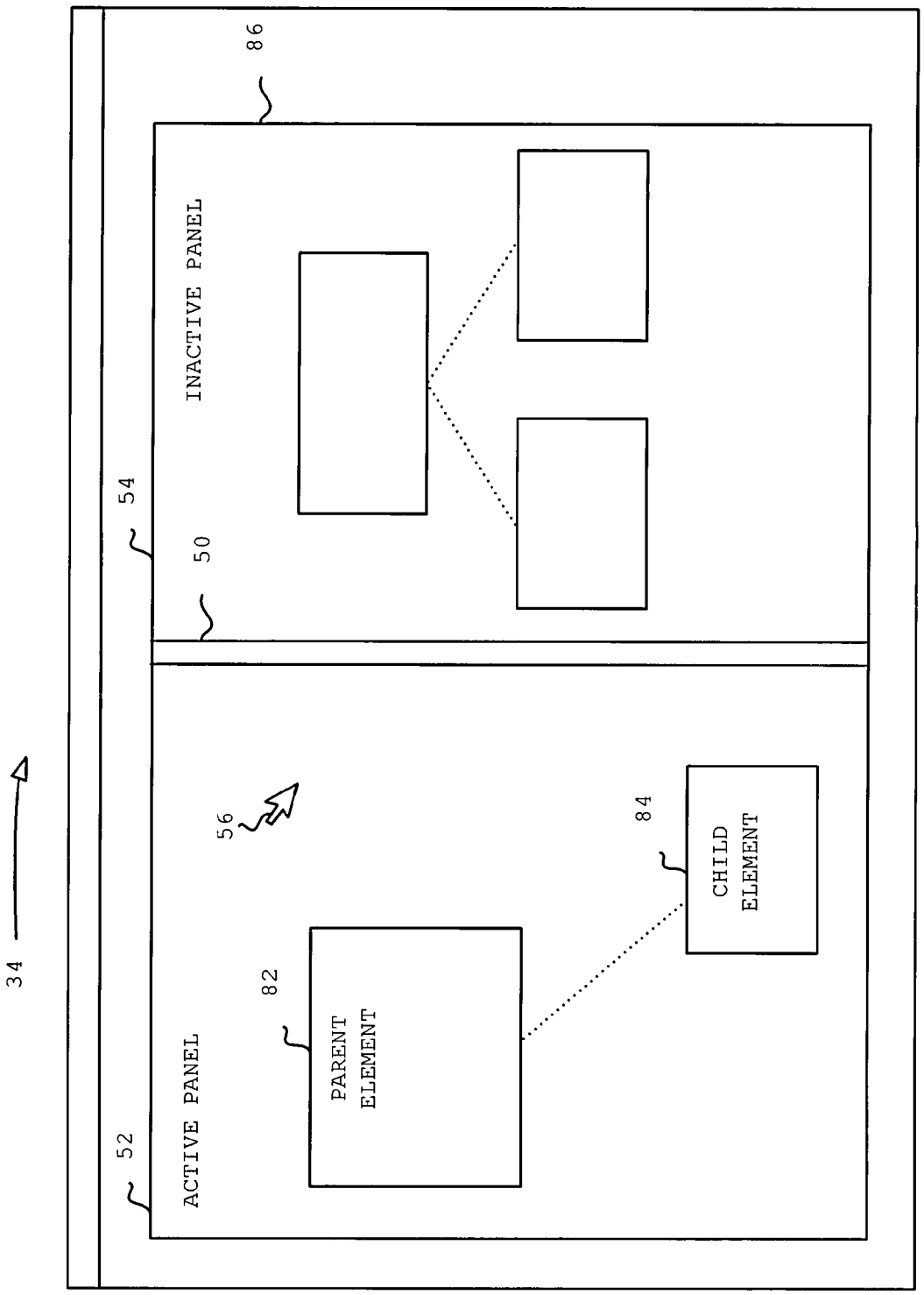
FIG. 5 is a schematic, pictorial illustration of a user interface screen for editing graphical user interface elements, in accordance with an alternative embodiment of the present invention.

Reference is now made to FIG. 5, which is a schematic, pictorial illustration of a user interface screen for editing graphical user interface elements, in accordance with an alternative embodiment of the present invention. In some embodiments, GUI management module 30 (FIG. 1) provides an ability to delineate relationships among GUI elements. In the present example, a parent GUI element 82 may have a relationship with a child GUI element 84, and may be related visually in a different editing window 86 using a tree structure. The relationship between parent GUI element 82 and child GUI element 84 in addition to usage of the tree structure may allow the GUI management module 30 to infer a property, for example, from the parent to the child when invoking the optimization function to determine the new configuration. Additionally or alternatively, GUI management module 30 may provide the ability to delineate other relationships among GUI elements, or to display relationships among GUI elements using other visual structure types.

In some embodiments, a set of conditions are checked by GUI management module 30 (FIG. 1) prior to resetting divider 50 to the new configuration. For example, one condition of the set of conditions may prevent automatic divider resetting unless a preconfigured time interval has passed since divider 50 has previously been dragged or has been automatically reset by GUI management module 30. The above-mentioned condition may be appropriately designed in order to prevent GUI management module 30 from resetting the configuration of the divider too frequently, thus potentially disturbing operator 32. In another example, a second condition of the set of conditions may prevent automatic divider resetting once a preconfigured maximum reset threshold, or total number of configuration resets has taken place. In yet another example, the previous two examples may be combined. A third condition of the set of conditions may merge the preconfigured maximum reset threshold and the preconfigured time interval so as to delineate a boundary for automatic divider resetting, whereby a maximum frequency is defined. In the present example, the third condition of the set of conditions may provide a limit of five automatic resets of divider 50 within a half-hour time interval.

In the previous description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus provide processes for implementing the functions/acts specified in the flowchart and/or block diagram block or blocks.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A computer-implemented method for adjusting a computer display, comprising:
presenting on a display of a computer a graphical user interface (GUI) management module for generation of a GUI that offers in an editing window selectable GUI elements and a visual indicator, the visual indicator being movable in the editing window, the editing window having at least two panels and a divider between the panels;
moving the divider to first locations of the divider in the editing window by actions of an operator;
moving the divider to second locations of the divider in the editing window automatically;
memorizing a configuration history of the divider comprising the first locations and the second locations of the divider in the editing window, wherein the first locations and the second locations occur with different frequencies;
defining an optimization function of the first locations and the second locations for determining a new location of the divider that is selected from the first locations and the second locations, wherein the optimization function minimizes a likelihood that the divider will need to be moved away from the new location;
determining that a focus event with respect to one of the GUI elements or one of the panels has occurred;
responsively to the focus event, invoking the optimization function responsively to the configuration history of the divider to determine the new location of the divider within the editing window; and
on the display automatically resetting the divider to the new location within the editing window.

2. The method according to claim 1, wherein invoking the optimization function comprises:
determining a current location of the visual indicator;
identifying a most proximate one of the GUI elements to the current location; and
correlating the configuration history with the current location and the most proximate one of the GUI elements.

3. The method according to claim 2, wherein the focus event is selected from the group consisting of clicking a button on a pointing device, pressing a keyboard shortcut, and speaking a voice command.

4. The method according to claim 1, wherein defining an optimization function comprises applying a learning algorithm to the configuration history.

5. The method according to claim 1, further comprising:
defining one or more conditions; and
automatically resetting the current configuration of the divider only if the one or more conditions are satisfied.

6. The method according to claim 5, wherein the one or more conditions comprise requiring a preconfigured time interval to expire before allowing the divider to be automatically reset.

7. A computer-implemented method for adjusting a computer display, comprising:
presenting on a display of a computer a graphical user interface (GUI) management module for generation of a GUI that offers in an editing window GUI elements that are selectable by use of a pointing device which generates a visual indicator on the editing window, the editing window having at least two panels and a divider between the panels;
moving the divider to first locations of the divider in the editing window by actions of an operator;
moving the divider to second locations of the divider in the editing window automatically;
memorizing a configuration history of the divider comprising the first locations and the second locations of the divider in the editing window, wherein the first locations and the second locations occur with different frequencies;
defining an optimization function of the first locations and the second locations for determining a new location of the divider that is selected from the first locations and the second locations, wherein the optimization function minimizes a likelihood that the divider will need to be moved away from the new location;
determining that a focus event with respect to one of the GUI elements or one of the panels has occurred;
responsively to the focus event, invoking the optimization function responsively to the configuration history of the divider to determine the new location of the divider within the editing window; and
on the display automatically resetting the divider to the new location within the editing window.

8. The method according to claim 7, wherein invoking the optimization function comprises:
determining a current location of the visual indicator;

identifying a most proximate one of the GUI elements to the current location; and correlating the configuration history with the current location and the most proximate one of the GUI elements.

9. The method according to claim 8, wherein determining a current location comprises changing a focus of the editing window by instigating a focus event wherein the focus event is selected from the group consisting of clicking a button on the pointing device, pressing a keyboard shortcut, and speaking a voice command.

10. The method according to claim 7, wherein defining an optimization function comprises applying a learning algorithm to the configuration history.

11. The method according to claim 7, further comprising:

defining one or more conditions; and automatically resetting the current configuration of the divider only if the one or more conditions are satisfied.

12. The method according to claim 11, wherein the one or more conditions comprise requiring a preconfigured time interval to expire before allowing the divider to be automatically reset.

13. A computer software product for adjusting a computer display, comprising a non-transitory computer storage medium in which computer program instructions are stored, wherein the instructions comprise distinct modules that include a graphical user interface (GUI) management module, which instructions, when executed by a computer, cause the computer to perform the steps of:

presenting on a display of a computer a graphical user interface (GUI) management module for generation of a GUI that offers in an editing window selectable GUI elements and a visual indicator, the visual indicator being movable in the editing window, the editing window having at least two panels and a divider between the panels;

moving the divider to first locations of the divider in the editing window by actions of an operator;

moving the divider to second locations of the divider in the editing window automatically;

memorizing a configuration history of the divider comprising the first locations and the second locations of the divider in the editing window, wherein the first locations and the second locations occur with different frequencies;

defining an optimization function of the first locations and the second locations for determining a new location of the divider that is selected from the first locations and the second locations, wherein the optimization function minimizes a likelihood that the divider will need to be moved away from the new location;

determining that a focus event with respect to one of the GUI elements or one of the panels has occurred;

responsively to the focus event, invoking the optimization function responsively to the configuration history of the divider to determine the new location of the divider within the editing window; and on the display automatically resetting the divider to the new location within the editing window.

14. The computer software product according to claim 13, wherein invoking the optimization function comprises:

determining a current location of the visual indicator;

identifying a most proximate one of the GUI elements to the current location; and correlating the configuration history with the current location and the most proximate one of the GUI elements.

15. The computer software product according to claim 14, wherein the focus event is selected from the group consisting of clicking a button on a pointing device, pressing a keyboard shortcut, and speaking a voice command.

16. The computer software product according to claim 13, wherein defining an optimization function comprises applying a learning algorithm to the configuration history.

17. The computer software product according to claim 13, further comprising:

defining one or more conditions; and automatically resetting the current configuration of the divider only if the one or more conditions are satisfied.

18. The computer software product according to claim 17, wherein the one or more conditions comprise requiring a preconfigured time interval to expire before allowing the divider to be automatically reset.

19. A data processing system for adjusting a computer display, comprising:

a display presenting a graphical user interface (GUI) management module for generation of a GUI that offers in an editing window selectable GUI elements and a visual indicator, the visual indicator being movable in the editing window, the editing window having at least two panels and a divider between the panels;

an input device which is operative to move the visual indicator in the editing window;

a processor; and a memory accessible to the processor storing programs and data objects therein, wherein execution of the programs causes the processor to perform the steps of:

moving the divider to first locations of the divider in the editing window by actions of an operator;

moving the divider to second locations of the divider in the editing window automatically;

memorizing a configuration history of the divider comprising the first locations and the second locations of the divider in the editing window, wherein the first locations and the second locations occur with different frequencies;

defining an optimization function of the first locations and the second locations for determining a new location of the divider that is selected from the first locations and the second locations, wherein the optimization function minimizes a likelihood that the divider will need to be moved away from the new location;

determining that a focus event with respect to one of the GUI elements or one of the panels has occurred;

responsively to the focus event, invoking the optimization function responsively to the configuration history of the divider to determine the new location of the divider within the editing window; and on the display automatically resetting the divider to the new location within the editing window.

20. The data processing system according to claim 19, wherein invoking the optimization function comprises:

determining a current location of the visual indicator;

identifying a most proximate one of the GUI elements to the current location; and correlating the configuration history with the current location and the most proximate one of the GUI elements.

21. The data processing system according to claim 20, wherein the focus event is selected from the group consisting of clicking a button on a pointing device, pressing a keyboard shortcut, and speaking a voice command.

22. The data processing system according to claim 19, wherein defining an optimization function comprises applying a learning algorithm to the configuration history.

23. The data processing system according to claim 19, further comprising:

defining one or more conditions; and automatically resetting the current configuration of the divider only if the one or more conditions are satisfied.

24. The data processing system according to claim 23, wherein the one or more conditions comprise requiring a preconfigured time interval to expire before allowing the divider to be automatically reset.

25. The method according to claim 1, wherein the focus event comprises a mouse movement from one of the panels to another of the panels.

26. The computer software product according to claim 13, wherein the focus event comprises a mouse movement from one of the panels to another of the panels.

27. The data processing system according to claim 19, wherein the focus event comprises a mouse movement from one of the panels to another of the panels.

* * * * *